(12) United States Patent
Cho et al.

(10) Patent No.: US 10,579,625 B2
(45) Date of Patent: Mar. 3, 2020

(54) PERSONALIZED REVIEW SNIPPET GENERATION AND DISPLAY

(71) Applicant: WAL-MART STORES, INC., Bentonville, AR (US)

(72) Inventors: Hyun Duk Cho, Mountain View, CA (US); Evren Korpeoglu, Sunnyvale, CA (US); Venkata Syam Prakash Rapaka, Cupertino, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 626 days.

(21) Appl. No.: 15/266,941

(22) Filed: Sep. 15, 2016

(65) Prior Publication Data

US 2018/0075110 A1    Mar. 15, 2018

(51) Int. Cl.
*G06F 17/30* (2006.01)
*G06F 16/2457* (2019.01)
*G06Q 30/06* (2012.01)
*G06F 16/28* (2019.01)

(52) U.S. Cl.
CPC .. *G06F 16/24573* (2019.01); *G06F 16/24575* (2019.01); *G06F 16/287* (2019.01); *G06Q 30/0625* (2013.01)

(58) Field of Classification Search
CPC ................................................ G06F 16/24573
USPC ........................................................ 707/728
See application file for complete search history.

(56) References Cited

U.S. PATENT DOCUMENTS

| | | |
|---|---|---|
| 8,010,480 B2 | 8/2011 | Dave et al. |
| 8,161,030 B2 | 4/2012 | Ruhl et al. |
| 8,630,843 B2 | 1/2014 | Cai et al. |
| 8,631,006 B1* | 1/2014 | Haveliwala ........... G06F 16/345 707/732 |
| 9,615,136 B1* | 4/2017 | Emery ............. H04N 21/47202 |
| 2007/0078671 A1* | 4/2007 | Dave ...................... G06Q 10/10 706/45 |
| 2008/0215571 A1* | 9/2008 | Huang .................. G06F 16/345 |
| 2012/0124604 A1* | 5/2012 | Small ................. H04N 21/4223 725/12 |
| 2012/0278065 A1* | 11/2012 | Cai ..................... G06Q 30/0278 704/9 |
| 2013/0212110 A1* | 8/2013 | Stankiewicz ...... G06Q 30/0631 707/740 |
| 2015/0235281 A1* | 8/2015 | Jain ..................... G06Q 30/0282 705/347 |

* cited by examiner

*Primary Examiner* — Hicham Skhoun
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving a plurality of user reviews of a product, performing topic modeling of the plurality of user reviews of the product to find a plurality of snippets within the plurality of user reviews each relating to at least one user attribute category of a plurality of user attribute categories, and facilitating a display on a device of a first snippet of the plurality of snippets proximate the product.

22 Claims, 7 Drawing Sheets

Very solid phone for the price　　　600　　　611　　　　　　　　　　　　01/28/2015
★ ★ ★ ★ ★ by An anonymous customer I picked this phone up on Thursday at 6PM for $40 and I've been very pleased with it. I've noticed only a few minor hiccups and very little lag overall, which is honestly what I expected since my previous phone (AT&T Fusion 3) had very similar specs to this phone. I haven't tested the water-proofness (is that a word? I don't think so) and I don't really plan on testing it so I'll just trust AT&T on that note. <u>Rear camera is surprisingly good quality and the 1080p video can really wow you in good lighting (keep in mind that's a $100 phone kind of "wow")</u>. It handles everything I do pretty well. As for gaming I'm not quite sure considering all I've played on it so far is Flappy Bird. The screen looks pretty good for not even being 720p. I do recommend going into the apps and disabling everything you don't use, like the AT&T default apps that will just run in the background. <u>Overall a solid phone and I'd definitely recommend it to someone looking to not spend a lot of money on a phone.</u> Treat it well and it will treat you well.

PERSONALIZED REVIEW SNIPPET GENERATION AND DISPLAY

TECHNICAL FIELD

This disclosure relates generally to review snippet display, and relates more particularly to personalized review snippet generation and display.

BACKGROUND

When searching for products for purchase on traditional ecommerce websites, consumers often are required to search through numerous reviews to find a portion of review that is relevant to their needs or desires. It can be inconvenient for consumers to read through lengthy and/or numerous reviews to determine if the product is likely to be a product the consumer is interested in.

BRIEF DESCRIPTION OF THE DRAWINGS

To facilitate further description of the embodiments, the following drawings are provided in which:

FIG. 6 illustrates a user review of a product, according to an embodiment; and

Figure 1:
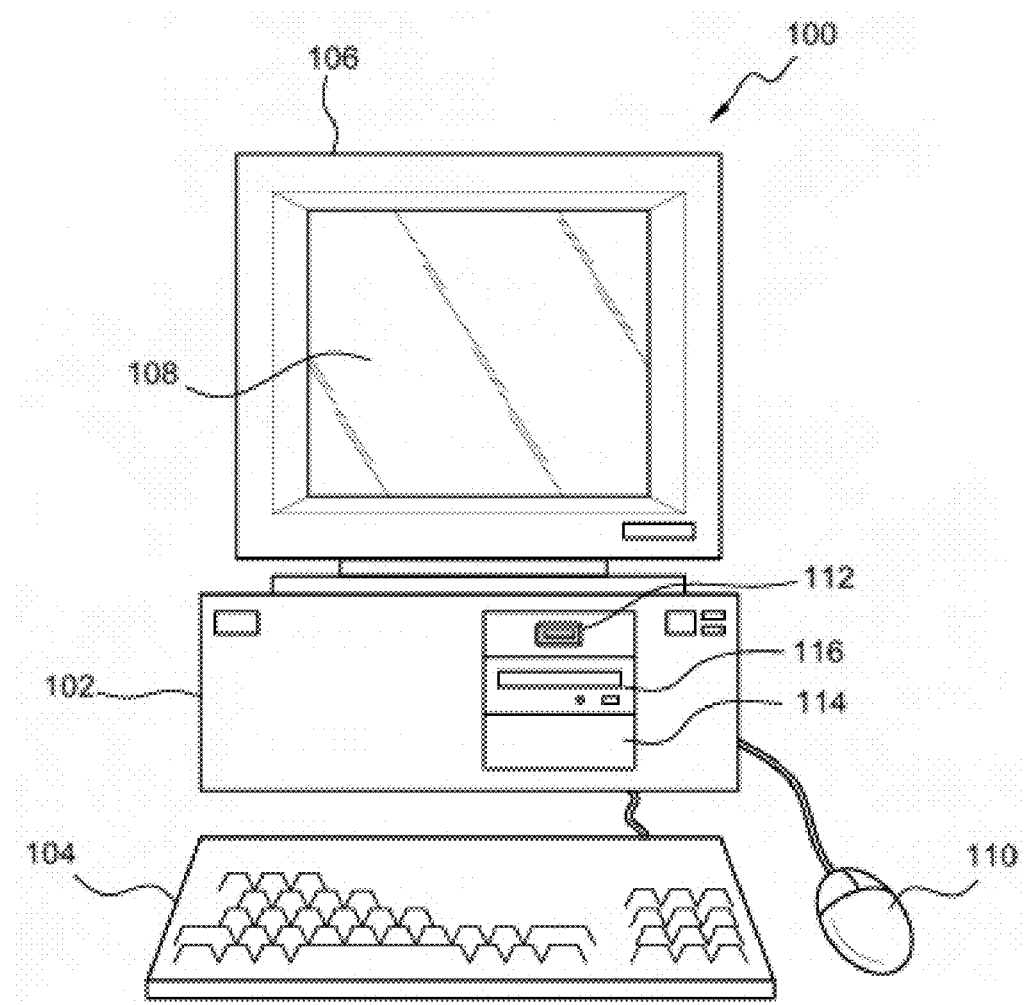
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more processing modules can be configured to run on the one or more processing modules and perform the act of receiving a plurality of user reviews of a product. The one or more processing modules also can be configured to run on the one or more processing modules and perform the act of performing topic modeling of the plurality of user reviews of the product to find a plurality of snippets within the plurality of user reviews each relating to at least one user attribute category of a plurality of user attribute categories. Additionally, the one or more processing modules can be configured to run on the one or more processing modules and perform the act of facilitating a display on a device of a first snippet of the plurality of snippets proximate the product.

Various embodiments include a method. The method can include receiving a plurality of user reviews of a product. The method also can include performing topic modeling of the plurality of user reviews of the product to find a plurality of snippets within the plurality of user reviews each relating to at least one user attribute category of a plurality of user attribute categories. The method can additionally include facilitating a display on a device of a first snippet of the plurality of snippets proximate the product.

Figure 2:
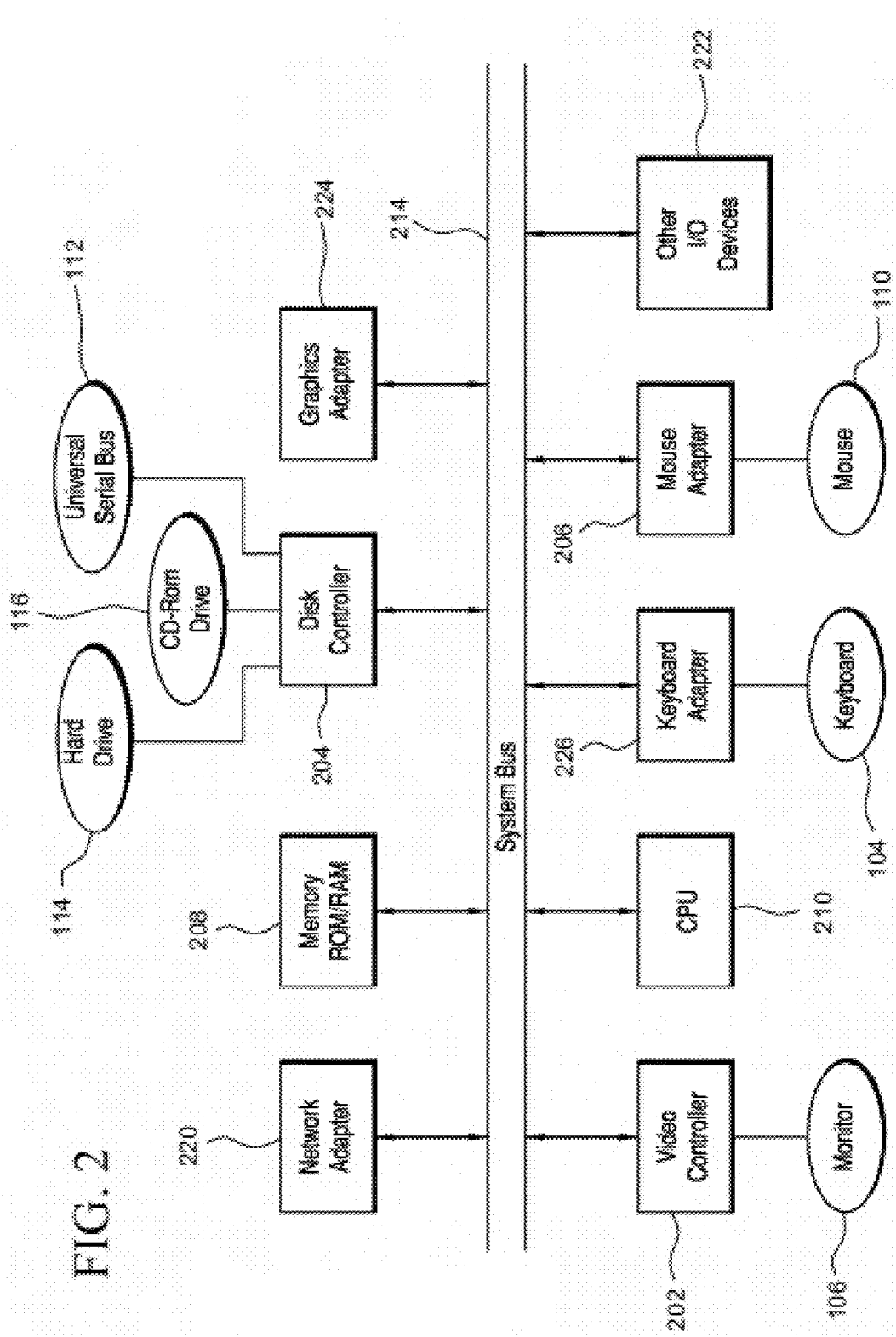
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microcprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
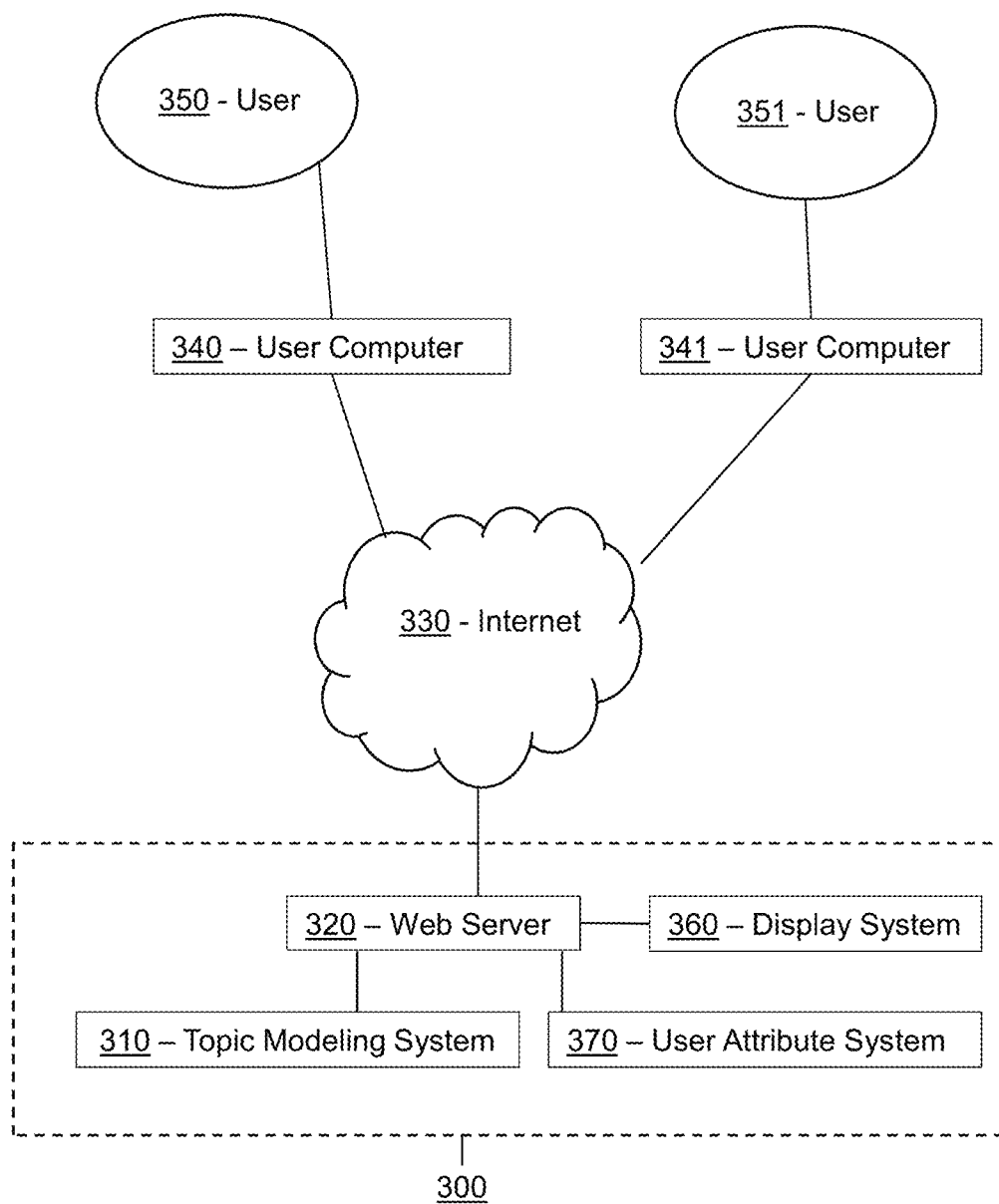
FIG. 3 illustrates a representative block diagram of a system, according to an embodiment.

Turning ahead in the drawings, FIG. 3 illustrates a block diagram of a system 300 that can be employed for personalized snippet generation. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a topic modeling system 310, a web server 320, a display system 360, and/or a user attribute system 370. Topic modeling system 310, web server 320, display system 360, and user attribute system 370 can each be a computer system, such as computer system 100 (FIG. 1), as described above, and can each be a single computer, a single server, or a cluster or collection of computers or servers, or a cloud of computers or servers. In another embodiment, a single computer system can host each of topic modeling system 310, web server 320, display system 360, and user attribute system 370. Additional details regarding topic modeling system 310, web server 320, display system 360, and user attribute system 370 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, topic modeling system 310, web server 320, display system 360, and user attribute system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) topic modeling system 310, web server 320, display system 360, and user attribute system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of topic modeling system 310, web server 320, display system 360, and user attribute system 370. In a similar manner, the processing module(s) and the memory storage module(s) can be local and/or remote to each other.

In many embodiments, topic modeling system 310, web server 320, display system 360, and user attribute system 370 can be configured to communicate with one or more customer computers 340 and 341. In some embodiments, customer computers 340 and 341 also can be referred to as user computers. In some embodiments, topic modeling system 310, web server 320, display system 360, and user attribute system 370 can communicate or interface (e.g. interact) with one or more customer computers (such as customer computers 340 and 341) through a network or internet 330. Internet 330 can be an intranet that is not open to the public. Accordingly, in many embodiments, topic modeling system 310, web server 320, display system 360, and user attribute system 370 (and/or the software used by such systems) can refer to a back end of system 300 operated by an operator and/or administrator of system 300, and customer computers 340 and 341 (and/or the software used by such systems) can refer to a front end of system 300 used by one or more customers 350 and 351, respectively. In some embodiments, customers 350 and 351 also can be referred to as users. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, topic modeling system 310, web server 320, display system 360, and user attribute system 370 also can be configured to communicate with one or more databases. The one or more databases can comprise a product database that contains information about products, items, or SKUs sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between topic modeling system 310, web server 320, display system 360, and user attribute system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
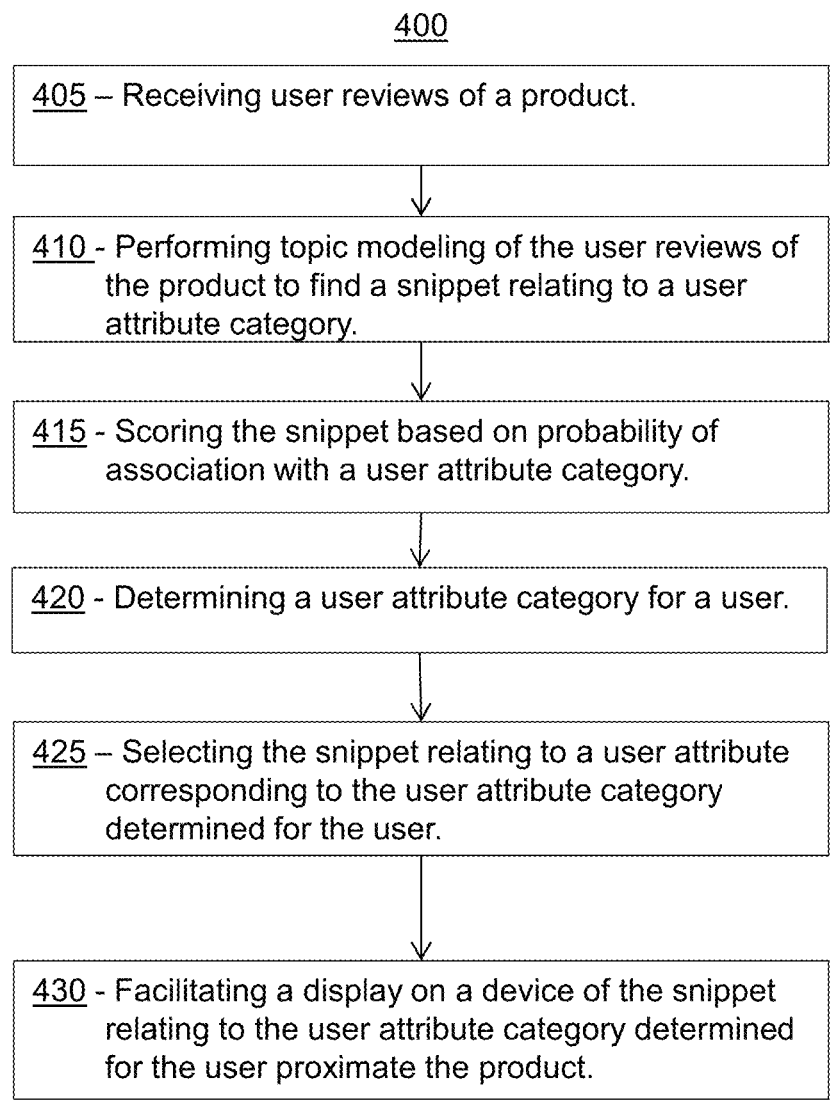
FIG. 4 is a flowchart for a method, according to an embodiment.
Figure 5:
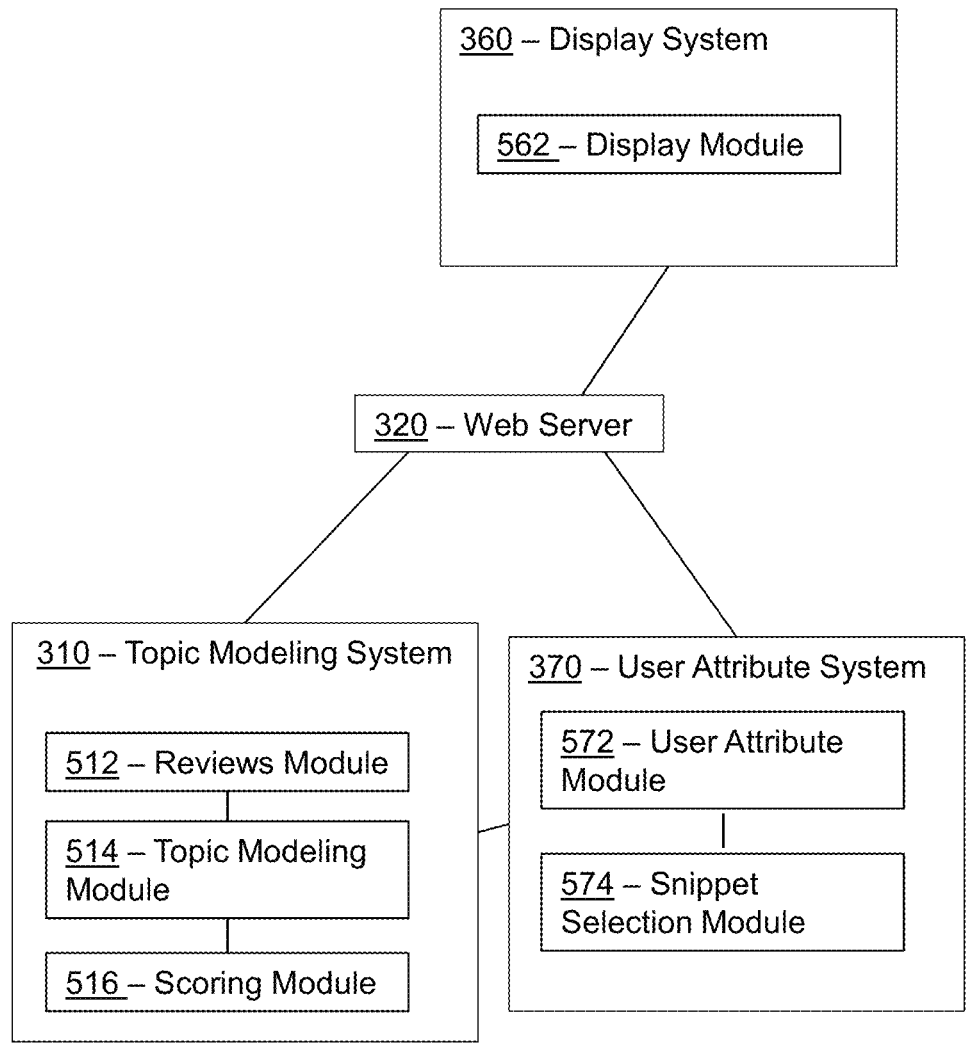
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, 516, 562, 572, and/or 574 (FIG. 5). Such non-transitory memory storage modules can be part of a computer system such as topic modeling system 310 (FIGS. 3 & 5), display system 360 (FIGS. 3 & 5), and/or user attribute system 370 (FIGS. 3 & 5). The processing module(s) can be similar or identical to the processing module(s) described above with respect to computer system 100 (FIG. 1).

Various embodiments are directed to one or more specific improvements to the way computers operate. For example, various embodiments support large pools of review snippets mined automatically from data, thereby enabling a rich and tailored experience for the user. In some embodiments, latency of the computer system is reduced to operate at an average latency of less than 16 milliseconds per page. Furthermore, various embodiments are necessarily rooted in computer technology in order to overcome one or more problems specifically arising in the realm of computer networks, the internet, an intranet, etc. For example, a problem encountered with ecommerce websites of computer networks is the inability for computer systems to evaluate the natural language of user reviews to (a) find snippets or portions of the user reviews that relate to certain user attribute categories, (b) determine one or more user attribute categories based upon a browsing history of the user, and/or (c) automatically and instantaneously facilitate or coordinate display of a relevant snippet proximate a product displayed to the user while the user browses the ecommerce website.

Method 400 can comprise an activity 405 of receiving a plurality of user reviews of a product. For example, reviews module 512 (FIG. 5) of topic modeling system 310 (FIG. 5) can be configured to receive a plurality of user reviews of one or more products. In many embodiments, a method can comprise an activity of receiving a plurality of user reviews for a plurality of products. For example, a method can comprise an activity of receiving a plurality of user reviews for a first product, a plurality of user reviews for a second product, and so on. Upon receiving a plurality of reviews of a product, the plurality of reviews may be stored on a database of reviews module 512 or any other database associated with system 300.

Method 400 can further comprise an activity 410 of performing topic modeling of the plurality of user reviews of the product to find or extract at least one snippet within the plurality of user reviews relating to at least one user attribute category of a plurality of user attribute categories. For example, topic modeling module 514 (FIG. 5) of topic modeling system 310 (FIG. 5) can be configured to run various topic modeling of the plurality of user reviews of a product to find at least one snippet within the plurality of user reviews relating to at least one user attribute category. In some embodiments, a natural language processor is utilized to parse natural language of user reviews to find at least one snippet within the plurality of user reviews relating to at least one user attribute category. In some embodiments, a single snippet can relate to a plurality of user attribute categories. In some embodiments, a single user review can include a plurality of snippets each relating to one or more user attribute categories. As used herein, a snippet refers to one or more sentences or phrases within a user review. In many embodiments, user attribute categories comprise value-conscious, quality-conscious, brand-conscious, product popularity, gender, age, location, and/or any combination thereof. Performing topic modeling of the plurality of reviews of a product to find or extract at least one snippet can be accomplished according to any topic modeling or other snippet generation known in the art configured to find a snippet within a review relating to a desired aspect or user attribute category, such as but not limited to running variant of topic models of the plurality of reviews.

In many embodiments, performing the topic modeling of the plurality of user reviews of the product can comprise performing the topic modeling for each of a plurality of user reviews for each of a plurality of products to find one or more snippets within the plurality of reviews relating to one or more user attributes. For example, performing the topic modeling of the plurality of user reviews of the product can comprise performing the topic modeling of a first plurality of user reviews of a first product to find a first snippet within the first plurality of user reviews relating to a first user attribute category of the plurality of user attribute categories, as well as performing topic modeling of the second plurality of user reviews of the second product to find a second snippet within the second plurality of user reviews relating to a second user attribute category of the plurality of user attribute categories different from the first user attribute category. Alternatively or additionally, performing the topic modeling of the plurality of user reviews of the product can comprise performing the topic modeling of the first plurality of user reviews of the first product to find a first snippet within the first plurality of user reviews relating to a first user attribute category of the plurality of user attribute categories, as well as performing topic modeling of the second plurality of user reviews of the second product to find a second snippet within the second plurality of user reviews relating to the first user attribute category of the plurality of user attribute categories. Thus, the found snippets from the reviews of the plurality of products can relate to the same user attribute category or different user attribute categories of the plurality of user attribute categories.

Upon topic modeling of the plurality of reviews, each snippet found or otherwise extracted from the plurality of reviews can be assigned or labeled with one or more user attribute categories to which the snippet relates. For example, FIG. 6 provides a non-limiting example of a user review 600 of a product. Performing topic modeling on user review 600 shown in FIG. 6 finds two snippets 611 and 612. Snippet 611 states: "Rear camera is surprisingly good quality and the 1080p video can really wow you in good lighting (keep in mind that's a $100 phone kind of 'wow')." Performing topic modeling of review 600 can determine that snippet 611 relates to both a quality-conscious user attribute category and a brand-conscious user attribute category, and thus snippet 611 is assigned to or labeled with both quality-conscious and brand-conscious user attribute categories. Snippet 612 states: "Overall a solid phone and I'd definitely recommend it to someone looking to not spend a lot of money on a phone." Performing topic modeling of this review 600 can determine that snippet 612 relates to a value-conscious user attribute category, and thus snippet 612 is assigned to or labeled with a value-conscious user attribute category.

Method 400 can further comprise an activity 415 of scoring the snippet based on probability of association with a user attribute category. In some embodiments, scoring the snippet can comprise scoring each snippet of the plurality of snippets from a plurality of reviews based on probability of association with each user attribute category of the plurality of user attribute categories. For example, scoring module 516 (FIG. 5) of topic modeling system 310 (FIG. 5) can be configured to score a first snippet based on a probability of association with a first or any other user attribute category, a second snippet based on probability of association with a first or any other user attribute category, and so on. A first snippet determined to have a higher score for a first user attribute category has a higher probability of association with the first user attribute category than a second snippet determined to have a lower score for the first user attribute category relative to the first snippet. Thus, when selecting snippets as described below, a snippet with a higher score for a particular user attribute category may be selected for display proximate a product. Scoring of the snippet can be accomplished when performing topic modeling on the user reviews.

In some embodiments, activity 415 of scoring the snippet can comprises scoring the snippet based on probability of association of one or more seed words with a user attribute category. Seed words can be manually provided to aid in learning topic associations via topic modeling. A user attribute category with a highest posterior probability of the given seed words can be selected as the optimal user category. For example, one non-limiting embodiment can comprise: (1) four seed words: quality, good, comfortable, and cheap; and (2) two topics. For the first topic, the probabilities p(w|topic=1) can be: quality: 0.5; good: 0.3; comfortable: 0.1; and cheap: 0.1. For the second topic, the probabilities p(w|topic=2) can be: quality: 0.1; good: 0.2; comfortable: 0.1; and cheap: 0.6. Supposing, in a non-limiting example, the seed words are quality and comfortable, both with weight 1.0. The posterior probabilities are then 0.5*0.1 for topic 1, and 0.1*0.1 for topic 2 since their probabilities are: quality: 0.5, comfortable: 0.1; and quality: 0.1, comfortable: 0.1, respectively.

Method 400 can further comprise an activity 420 of determining at least one user attribute category of the plurality of user attribute categories for a user. For example, user attribute module 572 (FIG. 5) of user attribute system 370 (FIG. 5) may be configured to determine at least one user attribute category of the plurality of user attribute categories for a user. In many embodiments, at least two or more user attribute categories of the plurality of user attribute categories may be determined for the user. For example, determining the user attribute category of the plurality of user attribute categories for the user can comprise determining a first user attribute category of the plurality of user attribute categories for the user and a second user attribute category of the plurality of user attribute categories for the user different from the first user attribute category for the user.

Determining the user attribute category can comprise determining the user attribute category based upon a browsing or search history of the user and/or a profile information of the user. For example, if a user is signed into an account on an ecommerce website, one or more of the plurality of user attribute categories may be known for the user from the profile information entered by the user when registering for the account on the ecommerce website. In some embodiments, a user may select the user attribute categories in which the user is interested. In some embodiments, a user attribute may be determined by the location of the user or the ecommerce website navigation history of the user. In some embodiments, determining a user attribute category can comprise defining one or more models around predefined behavior and mining for patterns indicative to particular user segments and/or user attribute categories. In some embodiments, patterns of interest in activity that can be clustered are found given historic data pertaining to user activity. Semantic associations or behavior tags to these clusters are usually assigned by introspecting samples from the populations.

Method 400 can further comprise an activity 425 of selecting a snippet of the plurality of snippets relating to at least one user attribute category of the plurality of user attribute categories that corresponds to a user attribute category determined for the user, wherein the first snippet is personalized to the user. For example, snippet selection module 574 (FIG. 5) of user attribute system 370 (FIG. 5) can be configured to select a snippet relating to the same user attribute category determined for the user for display with the product. Selecting a snippet of the plurality of snippets can comprise selecting a snippet of the plurality of snippets for display proximate a product. In some embodiments, seed words corresponding to user attribute categories encoded within the snippet can be used for selection of a snippet relating to the user attribute category determined for the user for display with a product.

Selecting a snippet relating to a user attribute category that corresponds to a user attribute category determined for a user result in a personalized snippet for display to the user is more likely to provide the user with relevant review information. In many embodiments, selecting a snippet relating to a user attribute category that corresponds to the user attribute category determined for a user for display with a product is selected by finding the snippet that maximizes the probability of the snippet relating to the at least one user attribute category corresponding to the determined user attribute category of the user. The probability can be determined by the formula $$P(RS\mid U) = \sum_{a\in A} P(RS\mid a)\cdot P(a\mid U)$$

where P is the probability, RS is the snippet, U is the user, a is a specific determined user attribute category, and A is the set of all the plurality of user attribute categories. More particularly, this formula can be determined by the steps described below. It is understood that, where p is the probability factor, p(a|RS) can be extracted using topic models and allow independent calculation of the user attribute category of a snippet for a given user attribute category. Also, p(a|U) can be extracted using the customer's behavior on the website and allow calculation of a user attribute category of the user independent of the user attribute category of the snippet. The following equations can be used as a reference for how the equation outlined below is calculated.

$$P(U\mid A) = \frac{P(U)P(A\mid U)}{P(A)}$$

$$P(RS\mid A) = \frac{P(RS)P(A\mid RS)}{P(A)}$$

$$P(U\mid A) \sim P(A\mid U)$$

$$P(RS\mid A) \sim P(A\mid RS)$$

In an embodiment, all of the potential user attribute categories that a snippet should sum up to 1, and all of the potential user attribute categories that a user can belong to should sum up to 1 to satisfy the probability formula. Thus, $$\sum_{a\in A} p(a\mid RS) = 1$$

and $$\sum_{a\in A} p(a\mid U) = 1$$

It follows, then that $$P(RS\mid U, I, C) = \frac{P(RS, U, I, C)}{Z}$$

where I is the specific product or item of interest, C is the collection of the plurality of reviews for the product, and Z is the normalization factory to sum up the equation to 1.

$$\frac{P(RS, U, I, C)}{Z} = \frac{P(I\mid RS, U, C)\cdot P(RS, U, C)}{Z}$$

Because the product I remains constant, the first numerator term on the right side of the above equation can be cancelled out. Because cancellation of the normalization factor would result in the same ranking, the normalization factor in the denominator on the right and left sides of the equation can be cancelled out. This leads to the equation $$P(RS,U,C)=P(C\mid RS,U)\cdot P(RS,U)$$

Because the collection of the plurality of reviews C is independent of the snippet RS of the user U, the first term on the right side of the equation can be cancelled out. This leads to the equation $$P(RS,U)=P(RS,U)\cdot P(U)$$

Because the probability of the user is constant, P(U) can be cancelled out as well.

This leads to the equation $$P(RS\mid U) = \sum_{a\in A} P(RS\mid a)\cdot P(a\mid U)$$

The above equation allows for the selection of the best or most relevant snippet of the plurality of snippets from product reviews for a product for a specific user given the user attribute category determined for the user.

Returning to FIG. 4, method 400 can further comprise an activity 430 of facilitating or coordinating a display on a device of the snippet. For example, display module 562 (FIG. 5) of display system 360 (FIG. 5) can be configured to facilitate a display on a device of the selected snippet relating to the user attribute category corresponding to the user attribute category determined for the user, where the snippet is displayed proximate the product on the display of the device. In other embodiments, the snippet selected for a display on a device proximate the product is not related to a user attribute category determined for the user and may instead be selected at random. In some embodiments, activity 430 can include the actual displaying of the snippet and the product on display.

In some embodiments, display system 300 is configured to facilitate a display on the device of a different snippet proximate each of a plurality of different products. The snippets displayed proximate the products may relate to the same user attribute category determined for the user or different user attribute categories determined for the user. For example, facilitating the display on the device of the snippet relating to the user attribute category determined for the user proximate the product on the device can comprise facilitating the display on the device of (a) the first snippet relating to the first user attribute category determined for the user and proximate the first product on the device, and (b) the second snippet relating to the second user attribute category determined for the user and different from the first user attribute category and proximate the second product on the device. Alternatively, facilitating the display on the device of the snippet relating to the user attribute category determined for the user proximate the product on the device can comprise facilitating the display on the device of (a) the first snippet relating to the first user attribute category determined for the user and proximate the first product on the device, and (b) the second snippet relating to the first user attribute category determined for the user and proximate the second product on the device.

Figure 7:
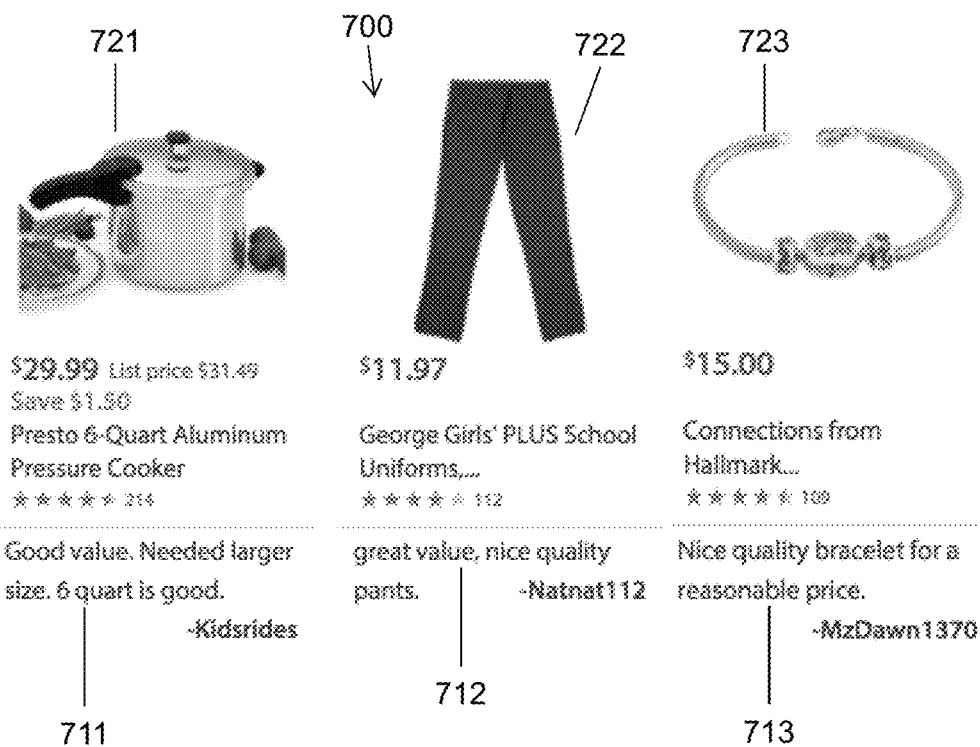
FIG. 7 illustrates a screenshot of snippets of user reviews proximate products displayed on a device.

In some embodiments, facilitating the display on the device of the snippet proximate the product can comprise facilitating the display on the device of the snippet proximate the product displayed in a product carousel. For example, FIG. 7 illustrates a screenshot of a portion of an example product carousel 700 displayed on a device. In the non-limiting example shown in FIG. 7, the product carousel includes three different products 721, 722, and 723. As shown in the screenshot, a first snippet 711 of a user review for a first product 721 is displayed proximate the first product 712, a second snippet 712 of a user review for a second product 722 is displayed proximate the second product 722, and a third snippet 713 of a user review for a third product 723 is displayed proximate the third product 723. Selection of the snippets for display proximate the respective products may be according to any of the select activities described elsewhere in this document. In some embodiments, such as the non-limiting embodiment shown in the screenshot of FIG. 7, facilitating the display on the device of the snippet proximate the product can comprise facilitating the display of only a picture of the product, a price of the produce, an overall rating of the product, a name of the product, and/or a snippet of a user review. In some embodiments, display of the one or more snippets and respective products is responsive to a search query entered by the user. In some embodiments, display of the one or more snippets and respective products is determined by an administrator of an ecommerce website for promotional purposes in alternative or addition to a user search query. Facilitating the display on the device of the snippet proximate the product can comprise facilitating the display of only the snippet of the user review proximate or adjacent to a display of the product on the device.

FIG. 5 illustrates a block diagram of a portion of system 300 comprising topic modeling system 310, web server 320, display system 360, and/or user attribute system 370 according to the embodiment shown in FIG. 3. Each of topic modeling system 310, web server 320, display system 360, and/or user attribute system 370 is merely exemplary and not limited to the embodiments presented herein. Each of topic modeling system 310, web server 320, display system 360, and/or user attribute system 370 can be employed in many different embodiments or examples not specifically depicted or described herein. In some embodiments, certain elements or modules of topic modeling system 310, web server 320, display system 360, and/or user attribute system 370 can perform various procedures, processes, and/or acts. In other embodiments, the procedures, processes, and/or acts can be performed by other suitable elements or modules.

In many embodiments, topic modeling system 310 can comprise non-transitory memory storage modules 512, 514 and 516, display system 360 can comprise a non-transitory memory storage module 562, and user attribute system 370 can comprise non-transitory memory storage modules 572 and 574. Memory storage module 512 can be referred to as reviews module 512, memory storage module 514 can be referred to as topic modeling module 514, and memory storage module 516 can be referred to as scoring module 516. Memory storage module 562 can be referred to as display module 562. Memory storage module 572 can be referred to as user attribute module 572, and memory storage module 574 can be referred to as snippet selection module 574.

In many embodiments, reviews module 512 can store computing instructions configured to run on one or more processing modules and perform one or more acts of methods 400 (FIG. 4) (e.g., activity 405 of receiving user reviews of a product (FIG. 4)). In some embodiments, topic modeling module 514 can store computing instructions configured to run on one or more processing modules and perform one or more acts of method 400 (FIG. 4) (e.g., activity 410 of performing topic modeling of the user reviews of the product to find a snippet relating to a user attribute category (FIG. 4)). In many embodiments, scoring module 516 can store computing instructions configured to run on one or more processing modules and perform one or more acts of method 400 (FIG. 4) (e.g., activity 415 of scoring the snippet based on probability of association with a user attribute category (FIG. 4)). In some embodiments, user attribute module 572 can store computing instructions configured to run on one or more processing modules and perform one or more acts of method 400 (FIG. 4) (e.g., activity 420 of determining a user attribute category for a user (FIG. 4)). In some embodiments, snippet selection module 574 can store computing instructions configured to run on one or more processing modules and perform one or more acts of method 400 (FIG. 4) (e.g., activity 425 of selecting a snippet (FIG. 4)). In some embodiments, display module 562 can store computing instructions configured to run on one or more processing modules and perform one or more acts of methods 400 (FIG. 4) (e.g., activity 430 of facilitating display on a device of the snippet relating to the user attribute category determined for the user proximate the product (FIG. 4)).

Although personalized review snippet generation and display has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processing modules; and
one or more non-transitory storage modules storing computing instructions configured to run on the one or more processing modules and perform acts of:
receiving a plurality of user reviews of a product;
performing topic modeling of the plurality of user reviews of the product to find a plurality of snippets within the plurality of user reviews, each snippet of the plurality of snippets relating to at least one user attribute category of a plurality of user attribute categories;
creating a score for each snippet of the plurality of snippets based on:
the topic modeling of the plurality of user reviews of the product; and
a probability of association between the at least one user attribute category and one or more seed words, the one or more seed words describing qualities of the product and having a weight describing an influence of the one or more seed words on the score for each snippet of the plurality of snippets; and
facilitating a display on a user device of a first snippet of the plurality of snippets proximate the product on the display of the user device, the first snippet having a highest score of the scores for the plurality of snippets.

2. The system of claim 1, wherein the one or more non-transitory storage modules storing the computing instructions are further configured to run on the one or more processing modules and perform acts of:
determining a first user attribute category of the plurality of user attribute categories for a user of the user device; and
selecting the first snippet of the plurality of snippets, wherein:
the first snippet relates to the at least one user attribute category of the plurality of user attribute categories;
the at least one user attribute category of the plurality of user attribute categories corresponds to the first user attribute category determined for the user; and
the first snippet is personalized to the user.

3. The system of claim 2, wherein determining the first user attribute category comprises determining the first user attribute category based upon a browsing history of the user.

4. The system of claim 2, wherein determining the first user attribute category comprises determining the first user attribute category based upon a profile information of the user.

5. The system of claim 2, wherein the one or more non-transitory storage modules storing the computing instructions are further configured to run on the one or more processing modules and perform an act of:
scoring each snippet of the plurality of snippets based upon a probability of association of each snippet of the plurality of snippets with each user attribute category of the plurality of user attribute categories.

6. The system of claim 2, wherein:
receiving the plurality of user reviews of the product comprises receiving a first plurality of user reviews of a first product and a second plurality of user reviews of a second product;
performing the topic modeling of the plurality of user reviews of the product comprises:
performing the topic modeling of the first plurality of user reviews of the first product to find the first snippet within the first plurality of user reviews relating to the first user attribute category of the plurality of user attribute categories; and
performing topic modeling of the second plurality of user reviews of the second product to find a second snippet within the second plurality of user reviews relating to a second user attribute category of the plurality of user attribute categories, wherein the second user attribute category is different from the first user attribute category;
selecting the first snippet of the plurality of snippets comprises selecting the first snippet of the plurality of snippets relating to the first user attribute category that corresponds to the first user attribute category, as determined for the user;
facilitating the display on the user device of the first snippet of the plurality of snippets proximate the product comprises facilitating the display on the user device of the first snippet of the plurality of snippets proximate the first product on the user device; and
the one or more non-transitory storage modules storing the computing instructions are further configured to run on the one or more processing modules and perform acts of:
determining the second user attribute category of the plurality of user attribute categories for the user is different from the first user attribute category for the user;
selecting the second snippet of the plurality of snippets relating to the second user attribute category that corresponds to the second user attribute category determined for the user; and
facilitating the display on the user device of the second snippet of the plurality of snippets proximate the second product on the user device.

7. The system of claim 2, wherein:
receiving the plurality of user reviews of the product comprises receiving a first plurality of user reviews of a first product and a second plurality of user reviews of a second product;
performing the topic modeling of the plurality of user reviews of the product comprises:
performing the topic modeling of the first plurality of user reviews of the first product to find the first snippet within the first plurality of user reviews relating to the first user attribute category of the plurality of user attribute categories; and
performing topic modeling of the second plurality of user reviews of the second product to find a second snippet within the second plurality of user reviews relating to the first user attribute category of the plurality of user attribute categories, wherein a second user attribute category is different from the first user attribute category;
facilitating the display on the user device of the first snippet of the plurality of snippets proximate the product comprises facilitating the display on the user device of the first snippet of the plurality of snippets proximate the first product on the display of the user device; and
the one or more non-transitory storage modules storing the computing instructions are further configured to run on the one or more processing modules and perform acts of:

selecting the second snippet of the plurality of snippets relating to the first user attribute category that corresponds to the first user attribute category determined for the user; and facilitating the display on the user device of the second snippet of the plurality of snippets proximate the second product on the display of the user device.

8. The system of claim 2, wherein a probability of the first snippet relating to the at least one user attribute category corresponding to the first user attribute category determined for the user is determined by an equation comprising:

$$P(RS \mid U) = \sum_{a \in A} P(RS \mid a) \cdot P(a \mid U),$$

where:
P is the probability of the first snippet relating to the at least one user attribute category;
RS is the first snippet;
U is the user;
a is the first user attribute category, as determined; and
A is the plurality of user attribute categories.

9. The system of claim 1, wherein the plurality of user attribute categories comprises value-conscious, quality-conscious, brand-conscious, product popularity, gender, age, and location.

10. The system of claim 1, wherein facilitating the display on the user device of the first snippet proximate the product comprises facilitating the display on the user device of the first snippet proximate the product displayed in a product carousel.

11. The system of claim 1, wherein:
receiving the plurality of user reviews of the product comprises receiving a first plurality of user reviews of a first product and a second plurality of user reviews of a second product;
performing the topic modeling of the plurality of user reviews of the product comprises:
performing the topic modeling of the first plurality of user reviews of the first product to find the first snippet within the first plurality of user reviews relating to a first user attribute category of the plurality of user attribute categories; and
performing topic modeling of the second plurality of user reviews of the second product to find a second snippet within the second plurality of user reviews relating to a second user attribute category of the plurality of user attribute categories, wherein the second user attribute category is different from the first user attribute category;
the one or more non-transitory storage modules storing the computing instructions are further configured to run on the one or more processing modules and perform acts of:
determining the first user attribute category of the plurality of user attribute categories for a user and the second user attribute category of the plurality of user attribute categories for the user different from the first user attribute category for the user based upon at least one of the user's browsing history and the user's profile information;
selecting the first snippet of the plurality of snippets relating to the first user attribute category of the plurality of user attribute categories that corresponds to the first user attribute category determined for the user, wherein the first snippet is personalized to the user;
selecting the second snippet of the plurality of snippets relating to the second user attribute category of the plurality of user attribute categories that corresponds to the second user attribute category determined for the user;
facilitating the display on the user device of the second snippet of the plurality of snippets relating to the second user attribute category determined for the user proximate the second product on the display of the user device; and
scoring each snippet of the plurality of snippets based upon a probability of association of each snippet of the plurality of snippets with each user attribute category of the plurality of user attribute categories, respectively;
facilitating the display on the user device of the first snippet proximate the product comprises facilitating the display on the user device of the first snippet relating to the first user attribute category determined for the user proximate the first product on the display of the user device;
the plurality of user attribute categories comprises value-conscious, quality-conscious, brand-conscious, product popularity, gender, age, and location;
a probability of the first snippet relating to the first user attribute category corresponding to the determined first user attribute category for the user is determined by a first equation comprising:

$$P_1(RS_1 \mid U) = \sum_{a_1 \in A} P_1(RS_1 \mid a_1) \cdot P_1(a_1 \mid U),$$

where:
$P_1$ is the probability of the first snippet relating to the first user attribute category;
$RS_1$ is the first snippet;
U is the user;
$a_1$ is the determined first user attribute category for the user; and
A is the plurality of user attribute categories; and
a probability of the second snippet relating to the second user attribute category corresponding to the determined second user attribute category for the user is determined by a second equation comprising:

$$P_2(RS_2 \mid U) = \sum_{a_2 \in A} P_2(RS_2 \mid a) \cdot P_2(a_2 \mid U),$$

where:
$P_2$ is the probability of the second snippet relating to the second user attribute category;
$RS_2$ is the second snippet;
U is the user;
$a_2$ is the determined second user attribute category for the user; and
A is the plurality of user attribute categories.

12. A method, comprising:
receiving a plurality of user reviews of a product;
performing topic modeling of the plurality of user reviews of the product to find a plurality of snippets within the plurality of user reviews, each snippet of the plurality of snippets relating to at least one user attribute category of a plurality of user attribute categories;

creating a score for each snippet of the plurality of snippets based on:
  the topic modeling of the plurality of user reviews of the product; and
  a probability of association between the at least one user attribute category and one or more seed words, the one or more seed words describing qualities of the product and having a weight describing an influence of the one or more seed words on the score for each snippet of the plurality of snippets; and facilitating a display on a user device of a first snippet of the plurality of snippets proximate the product on the display device of the user device, the first snippet having a highest score of the scores for the plurality of snippets.

13. The method of claim 12, further comprising:
determining a first user attribute category of the plurality of user attribute categories for a user of the user device; and
selecting the first snippet of the plurality of snippets, wherein:
  the first snippet relates to the at least one user attribute category of the plurality of user attribute categories;
  the at least one user attribute category of the plurality of user attribute categories corresponds to the first user attribute category determined for the user; and
  the first snippet is personalized to the user.

14. The method of claim 13, wherein determining the first user attribute category comprises determining the first user attribute category based upon a browsing history of the user.

15. The method of claim 13, wherein determining the first user attribute category comprises determining the first user attribute category based upon a profile information of the user.

16. The method of claim 13, further comprising scoring each snippet of the plurality of snippets based upon a probability of association of each snippet of the plurality of snippets with each user attribute category of the plurality of user attribute categories.

17. The method of claim 13, wherein:
receiving the plurality of user reviews of the product comprises receiving a first plurality of user reviews of a first product and a second plurality of user reviews of a second product;
performing the topic modeling of the plurality of user reviews of the product comprises:
  performing the topic modeling of the first plurality of user reviews of the first product to find the first snippet within the first plurality of user reviews relating to the first user attribute category of the plurality of user attribute categories; and
  performing topic modeling of the second plurality of user reviews of the second product to find a second snippet within the second plurality of user reviews relating to a second user attribute category of the plurality of user attribute categories, wherein the second user attribute category is different from the first user attribute category;
selecting the first snippet of the plurality of snippets comprises selecting the first snippet of the plurality of snippets relating to the first user attribute category that corresponds to the first user attribute category, as determined for the user;

facilitating the display on the user device of the first snippet of the plurality of snippets proximate the product comprises facilitating the display on the user device of the first snippet of the plurality of snippets proximate the first product on the user device; and
the method further comprises:
  determining the second user attribute category of the plurality of user attribute categories for the user is different from the first user attribute category for the user;
  selecting the second snippet of the plurality of snippets relating to the second user attribute category that corresponds to the second user attribute category determined for the user; and
  facilitating the display on the user device of the second snippet of the plurality of snippets proximate the second product on the user device.

18. The method of claim 13, wherein:
receiving the plurality of user reviews of the product comprises receiving a first plurality of user reviews of a first product and a second plurality of user reviews of a second product;
performing the topic modeling of the plurality of user reviews of the product comprises:
  performing the topic modeling of the first plurality of user reviews of the first product to find the first snippet within the first plurality of user reviews relating to the first user attribute category of the plurality of user attribute categories; and
  performing topic modeling of the second plurality of user reviews of the second product to find a second snippet within the second plurality of user reviews relating to the first user attribute category of the plurality of user attribute categories, wherein a second user attribute category is different from the first user attribute category;
facilitating the display on the user device of the first snippet of the plurality of snippets proximate the product comprises facilitating the display on the user device of the first snippet of the plurality of snippets proximate the first product on the display of the user device; and
the method further comprises:
  selecting the second snippet of the plurality of snippets relating to the first user attribute category that corresponds to the first user attribute category determined for the user; and
  facilitating the display on the user device of the second snippet of the plurality of snippets proximate the second product on the display of the user device.

19. The method of claim 13, wherein a probability of the first snippet relating to the at least one user attribute category corresponding to the first user attribute category determined for the user is determined by an equation comprising:

$$P(RS \mid U) = \sum_{a \in A} P(RS \mid a) \cdot P(a \mid U),$$

where:
P is the probability;
RS is the first snippet;
U is the user;
a is the first user attribute category, as determined; and
A is the plurality of user attribute categories.

20. The method of claim 13, wherein the plurality of user attribute categories comprises value-conscious, quality-conscious, brand-conscious, product popularity, gender, age, and location.

21. The method of claim 12, wherein facilitating the display on the user device of the first snippet proximate the product comprises facilitating the display on the user device of the first snippet proximate the product displayed in a product carousel.

22. The method of claim 12, wherein:
receiving the plurality of user reviews of the product comprises receiving a first plurality of user reviews of a first product and a second plurality of user reviews of a second product;
performing the topic modeling of the plurality of user reviews of the product comprises:
performing the topic modeling of the first plurality of user reviews of the first product to find the first snippet within the first plurality of user reviews relating to a first user attribute category of the plurality of user attribute categories; and
performing topic modeling of the second plurality of user reviews of the second product to find a second snippet within the second plurality of user reviews relating to a second user attribute category of the plurality of user attribute categories, wherein the second user attribute category is different from the first user attribute category;
the method further comprises:
determining first user attribute category of the plurality of user attribute categories for a user and second user attribute category of the plurality of user attribute categories for the user different from the first user attribute category for the user based upon at least one of the user's browsing history and the user's profile information;
selecting the first snippet of the plurality of snippets relating to the first user attribute category of the plurality of user attribute categories that corresponds to the first user attribute category determined for the user, wherein the first snippet is personalized to the user;
selecting the second snippet of the plurality of snippets relating to the second user attribute category of the plurality of user attribute categories that corresponds to the second user attribute category determined for the user;
facilitating the display on the user device of the second snippet of the plurality of snippets relating to the second user attribute category determined for the user proximate the second product on the user device; and
scoring each snippet of the plurality of snippets based upon a probability of association of each snippet of the plurality of snippets with each user attribute category of the plurality of user attribute categories, respectively;
facilitating the display on the user device of the first snippet proximate the product comprises facilitating the display on the user device of the first snippet relating to the first user attribute category determined for the user proximate the first product on the display of the user device;
the plurality of user attribute categories comprises value-conscious, quality-conscious, brand-conscious, product popularity, gender, age, and location;
a probability of the first snippet relating to the first user attribute category corresponding to the determined first user attribute category for the user is determined by a first equation comprising:

$$P_1(RS_1 \mid U) = \sum_{a_1 \in A} P_1(RS_1 \mid a_1) \cdot P_1(a_1 \mid U),$$

where:
$P_1$ is the probability of the first snippet relating to the first user attribute category;
$RS_1$ is the first snippet;
U is the user;
$a_1$ is the determined first user attribute category for the user; and
A is the plurality of user attribute categories; and
a probability of the second snippet relating to the second user attribute category corresponding to the determined second user attribute category for the user is determined by a second equation comprising:

$$P_2(RS_2 \mid U) = \sum_{a_2 \in A} P_2(RS_2 \mid a) \cdot P_2(a_2 \mid U),$$

where:
$P_2$ is the probability of the second snippet relating to the second user attribute category;
$RS_2$ is the second snippet;
U is the user;
$a_2$ is the determined second user attribute category for the user; and
A is the plurality of user attribute categories.

* * * * *